United States Patent [19]
Ward

[11] 3,815,746
[45] June 11, 1974

[54] AIR BLEED LIQUID FILTER ASSEMBLY
[75] Inventor: Harold L. Ward, Dunlap, Ill.
[73] Assignee: Caterpillar Tractor Co., Peoria, Ill.
[22] Filed: Feb. 18, 1972
[21] Appl. No.: 227,439

[52] U.S. Cl................. 210/134, 210/340, 210/436, 210/472
[51] Int. Cl............................................. B01d 35/16
[58] Field of Search ............ 210/340, 436, 472, 134

[56] References Cited
UNITED STATES PATENTS
2,526,372  10/1950  Leclair............................. 210/436 X
2,843,268  7/1958  Kennedy.......................... 210/440 X Primary Examiner—Frank A. Spear, Jr.
Attorney, Agent, or Firm—Phillips, Moore, Weissenberger, Lempio & Strabala

[57] ABSTRACT

An air bleed liquid filter assembly having a pair of independently replaceable filters. A control valve is positionable to change the flow of liquid from one filter to the other to permit replacement of the used filter without interrupting operation of the filter system. The control valve is further positionable to divert a portion of the liquid flow through the newly-installed filter and to vent any air entering the system during such filter replacement operation to assure that a continuous air-free flow of filtered liquid is discharged from the filter assembly.

10 Claims, 2 Drawing Figures

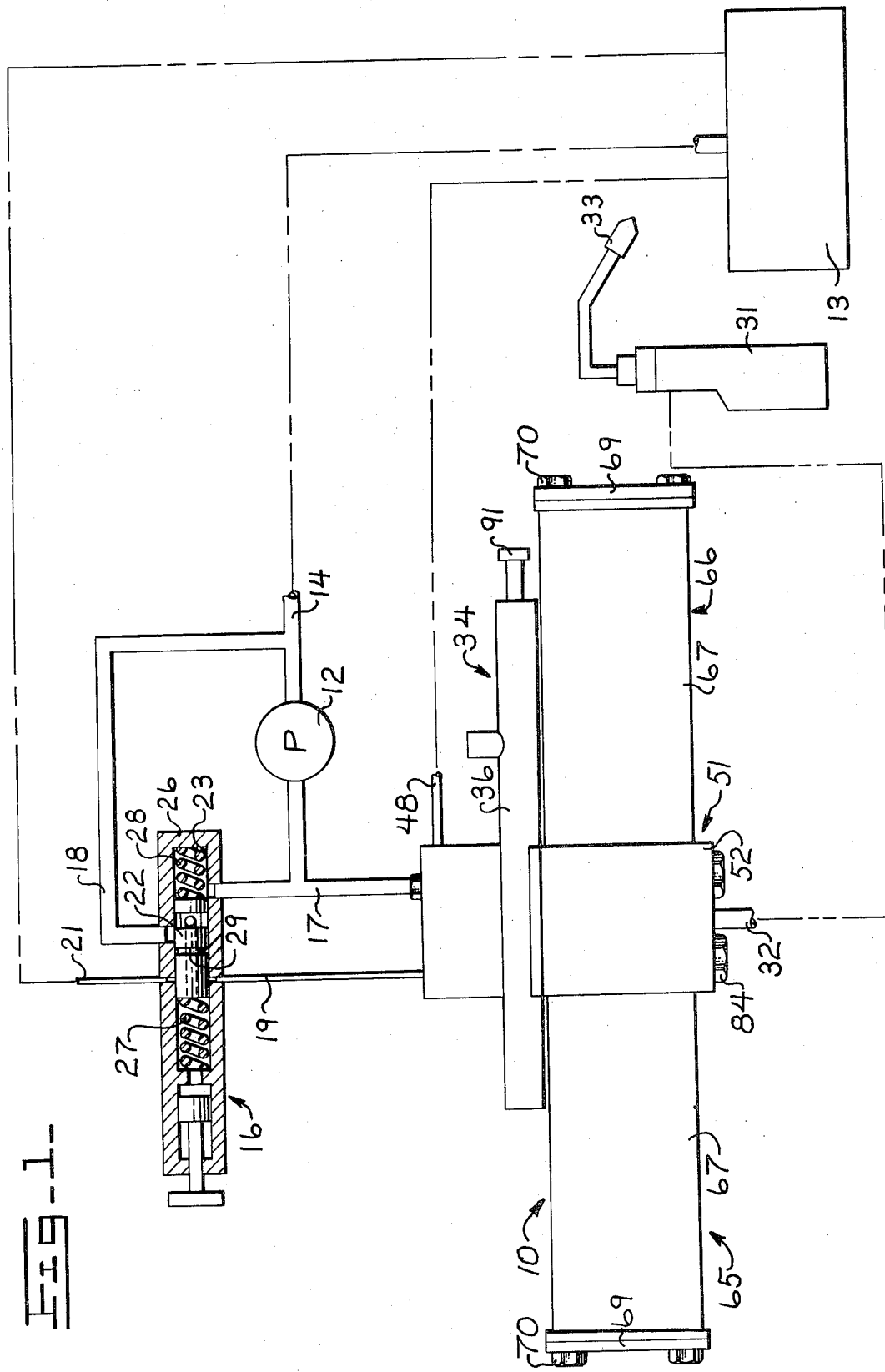

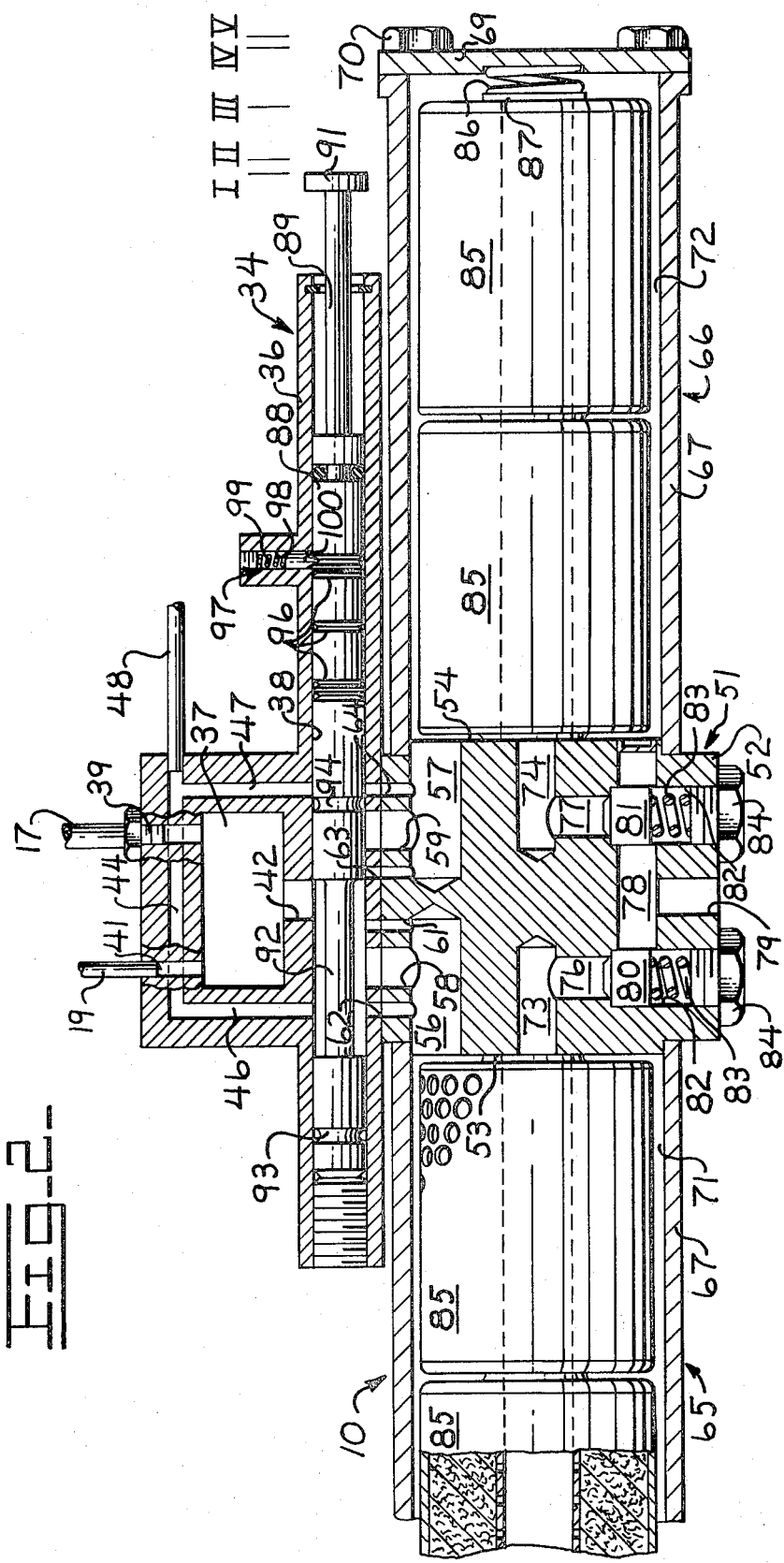

3,815,746

AIR BLEED LIQUID FILTER ASSEMBLY

BACKGROUND OF THE INVENTION

The fuel systems for internal combustion engines and other liquid and hydraulic systems are commonly provided with a filter to remove foreign particles therefrom. The pressure and volume of fuel to such an engine is reduced by a dirty filter frequently to an extent causing the engine to operate erratically. To avoid this, the fuel filters are changed periodically while the engine is shut down. However, engines utilized in some applications such as industrial, marine and electrical generating applications operate continuously and the filter change must be made without shutting down the engine. In those cases, the fuel system is usually provided with a pair of filters and a rotary changeover valve to switch the fuel flow from one filter to the other while one is being changed. Changing a filter introduces a certain amount of air into the system when a new filter is placed into service and this causes the engine to operate roughly. In order to overcome this problem, a bleeding procedure is required in conjunction with the rotary valve to purge the system of air. This usually requires several bleed screws or valves which must be manually opened and closed until the undesired air has been dissipated and the engine can run smoothly.

SUMMARY AND OBJECTS OF THE INVENTION

The present invention provides an improved air bleed liquid filter assembly which permits the changing of the filter elements of one filter unit without interrupting the flow of filtered fuel from the filter assembly and which permits entrapped air to be bled from the system to provide a continuous air-free flow of filtered fuel to the fuel injection pump. This is accomplished through the utilization of a single multiposition control valve having one position in which the fuel flow can be selectively directed through one of the filter units while blocking flow to the other. In another position, the main flow is directed through one filter unit with a portion of the fuel being directed to the newly-installed filter unit for venting any air entering the filter unit during the replacement operation.

It is an object of this invention to provide an improved air bleed liquid filter assembly having a pair of independently replaceable filters which permits changing of a selected filter while providing a continuous uninterrupted flow of filtered liquid from the filter assembly.

Another object of this invention is to provide an air bleed liquid filter assembly which is capable of purging any air entering the system during a filter change prior to putting the newly-installed filter into service.

Another object of this invention is to provide an improved air bleed liquid filter assembly which utilizes a single multi-position control valve to simplify the changing of a filter and the purging of the air from the system after a new filter has been installed.

Other objects and advantages of the present invention will become more readily apparent upon reference to the accompanying drawings and following description.

BRIEF DESCRIPTION OF THE DRAWINGS

FIG. 1 is a schematic, partially cross-sectional view of an air bleed liquid filter assembly embodying the principles of the present invention in operating position within a fuel system of an internal combustion engine.

FIG. 2 is an enlarged view of a portion of the air bleed liquid filter assembly of FIG. 1.

DETAILED DESCRIPTION

Referring more particularly to the drawings, an air bleed liquid filter assembly embodying the principles of the present invention is generally indicated by the reference numeral 10 in association with a fuel system for an internal combustion engine (not shown). The fuel system includes an engine-driven transfer pump 12 which communicates with a fuel tank 13 through a conduit 14. A valve 16 is connected to the filter assembly and transfer pump by way of a conduit 17 and to conduit 14 through a conduit 18. A vent conduit 19 extends between the filter assembly and the valve and a vent conduit 21 extends from the valve to the fuel tank.

The valve 16 is of the type described in U.S. Pat. No. 3,627,450, of common assignment herewith. The valve functions as a priming mechanism and as a bypass means to control system pressure during engine operation and to provide a continuously controlled air bleed during engine operation. For purposes of the present invention, it is sufficient to note that the valve includes a piston or shuttle 22 slidably disposed within a bore 23 within the valve body 26 wherein the piston is balanced between a pair of springs 27 and 28. The piston is provided with an annular groove 29.

The fuel system further includes an engine-driven fuel injection pump 31 connected to the air bleed liquid filter assembly 10 through a conduit 32. An injection nozzle 33 is connected to the injection pump to deliver fuel to the cylinders of the combustion engine in the usual manner.

As best shown in FIG. 2, the air bleed liquid filter assembly 10 includes a manually operated control valve 34 which has a valve body 36 formed with a manifold chamber 37 therein. An inlet port 39 and a vent port 41 are formed within the valve body and communicate the manifold chamber with the conduits 17 and 19, respectively. The valve body has a cylindrical bore 38 formed therein which communicates with the manifold chamber 37 through an inlet passage 42 formed within the body. An exhaust port 44 is formed within the valve body and has a pair of branch exhaust passages 46 and 47 communicating with the bore. Each exhaust passage is spaced axially from the inlet passage 42 at opposite sides thereof. The exhaust port 44 communicates with the fuel tank 13 by means of a vent conduit 48.

The valve body 36 of the control valve 34 is secured to the top of a filter mounting base 51 which base includes a rectangular block 52 having a pair of opposite side surfaces 53 and 54 which are normally disposed with respect to the cylindrical bore 38 of the valve body. A pair of intake passages 56 and 57 are formed within the block with each extending inwardly from a respective side surface. A pair of outlet passages 58 and 59 are formed within the valve body and block with each spaced axially from the inlet passage 42 at opposite sides thereof for connecting the cylindrical bore with the intake passages 56 and 57, respectively. An orifice 61 and a vent passage 62 are formed within the valve body and block and extend between the cylindrical bore and intake passage 56. An orifice 63 and a vent passage 64 are formed within the valve body and block and extend between the cylindrical bore and intake passage 57. The orifices 61 and 63 are spaced axially from the inlet passage 42 and between the outlet passages 58 and 59. The vent passages 62 and 64 are arranged diametrically opposite the exhaust passages 46 and 47, respectively.

Referring to FIG. 1, it will be noted that the air bleed liquid filter assembly further includes a pair of filter housing units 65 and 66 each of which includes a tubular extension 67 secured, as by welding or the like, to the side surfaces 53 and 54 of the rectangular block 52. An end plate 69 is sealingly secured to the outer ends of each tubular extension by a plurality of bolts 70 to form a pair of filter chambers 71 and 72 which communicate with the intake passages 56 and 57, respectively.

A pair of outlet passages 73 and 74 are formed within the block 52 of the filter mounting base 51 and extend inwardly from the side surfaces 53 and 54, respectively. A pair of passages 76 and 77, as viewed in FIG. 2, are formed within the block and intersect the outlet passages 73 and 74, respectively. The passages 76 and 77 are interconnected by means of a cross passage 78 which also communicates with a discharge port 79 connected to the conduit 32. A pair of check valves 80 and 81 are individually slidably disposed in bores 82 coaxially arranged with respect to passages 76 and 77. Each of the valves is urged into a blocking position to block communication between its respective passage and the cross passage 78 by means of a spring 83 disposed between the valve and a threaded plug 84.

Each of the filter units 65 and 66 is adapted to receive a plurality of replaceable filter elements 85 within the filter chambers 71 and 72 with the filter elements being arranged in a stacked, end-to-end relationship. A spring 86 and bearing plate 87 are disposed between the outer filter elements and the end plates 69 to resiliently retain the filter elements in the desired relationship with the inner filter elements abutting the respective side surfaces of the block 52.

The control valve 34 includes an annular valve spool 88 disposed within the cylindrical bore 38 of the valve body 36 and axially movable therein between a first, second, third, fourth, and fifth position, as indicated in FIG. 2. The valve spool, which is shifted manually, has a reduced-diameter portion 89 at one end thereof which extends outwardly from the valve body and terminates with a knob portion 91. The valve spool has a further reduced portion 92 approximately intermediate its ends and a pair of annular grooves 93 and 94, each of which is axially spaced from the reduced portion at an opposite side thereof. A plurality of V-shaped notches 96 are formed in the valve spool intermediate the groove 94 and end portion 89.

A detent mechanism 97 is situated within the valve body 36 to aid in locating and holding the selected position of the valve spool 88. The detent mechanism is arranged within a closed passage 98 within the valve body. A compression spring 99 is disposed in the passage 98 and acts against a detent element 100 to cause the element to bear against an adjacent portion of the spool so as to engage one of the notches 96. The detent mechanism holds the valve spool at a selected one of the described positions. The spool may, of course, be moved to any other position by applying a force against the knob 91 sufficiently to overcome the spring 99.

OPERATION

The operation of the present invention will now be described. The fuel system provides a flow of pressurized fuel to the fuel injection pump 31 of the engine in the following manner. The engine-driven transfer pump 12 draws fuel from fuel tank 13 and delivers it through conduit 17 to the control valve 34 of the air bleed liquid filter assembly 10 and to the valve 16. If the fuel pressure in the filter assembly exceeds a predetermined amount, a portion of the fuel which enters the valve 16 forces the piston 22 to the left, as viewed in FIG. 1, against the bias of the spring 27 and moves the piston until fuel can escape from the valve through the conduit 18 to bypass the pump and return to the inlet conduit 14. The valve 16 thus controls fuel system pressure. With the piston 22 in the described position, the annular groove 29 communicates the vent conduits 19 and 21 and provides an air-bleed path from the manifold chamber 37 of the control valve to the fuel tank 13.

The control valve 34 directs fuel through the filter system with each of the five noted positions of the valve spool 88 providing a predetermined mode of operation. As will hereinafter be described in detail, the first and fifth positions of the valve spool are similar in that in each of these positions the spool directs fuel flow through one of the filter units while blocking the flow from the other filter unit to permit the filter elements of the blocked filter unit to be replaced without interrupting flow of fuel to the engine.

Fuel from the transfer pump 12 enters the manifold chamber 37 and is communicated to the bore 38 through the inlet passage 42. Any air entrained within the fuel emitted from the transfer pump is bled from the upper portion of manifold chamber 37 through outlet port 41 and vent conduits 19 and 21 to the tank. With the valve spool 88 in the first position, as shown in FIG. 2, the reduced portion 92 communicates inlet passage 42 with outlet passage 58 and permits fuel to flow therethrough into the intake passage 56 where it enters the filter chamber 71 of filter unit 65. The fuel then flows through the filter elements 85 within the filter chamber which removes foreign particles therefrom. Filtered fuel then flows from the chamber 71, through passages 73 and 76, to unseat the check valve 80 and move into passage 76, through passage 78, discharge port 79, and conduit 32 to the fuel injection pump 31. When the spool is in position I, the check valve 81 blocks communication between passage 78 and passage 77 to prevent any reverse flow of fuel into the filter chamber 72 of the filter unit 66.

With the valve spool 88 in the first position, lands on the valve spool 88 block fuel flow from passage 59, orifice 63, and vent passage 64 and thereby prevent fuel from entering the filter chamber 72 of filter unit 66. Thus, the replaceable filter elements 85 within the filter chamber 72 may be replaced after removal of the end plate 69 without interrupting the flow of filtered fuel to the fuel injection pump.

The fifth position of the valve spool 88 is obtained by manually moving the valve spool to the extreme rightward position shown in FIG. 2. The fifth position of the spool causes the direction of fuel through the filter unit 66 to subsist while fuel flow from filter unit 65 is blocked. In this position, the reduced portion 92 of the valve spool 88 directs the main flow of fuel through passages 59 and 57 into filter chamber 72. The fuel passes through the filter elements 84 contained within the filter chamber and out through passages 74 to unseat the check valve 81 which blocks the pasage 77, and through passage 78 to discharge port 79 and conduit 32. The check valve 80 blocks reverse fuel flow to the passage 76. Land portions of the valve spool block passage 58, orifice 61, and vent passage 62 to prevent fuel from entering filter chamber 71 of filter unit 65 to thereby permit the removal of filter elements 85 from chamber 71.

Replacement of the filter elements 85 in either of the filter units 65 or 66 can cause a certain amount of air to become entrapped within the respective filter chambers 71 or 72. Such air must be bled from the system prior to putting the newly installed filter unit into service. The control valve 34 is provided with a second and fourth position for bleeding the air from filter units 66 and 65, respectively. The bleeding operation is accomplished without interrupting the flow of fuel from the filter assembly.

To bleed the chamber 72 of filter unit 66, the valve spool 88 is shifted to the second position. This is obtained by manually moving the valve spool toward the right, in FIG. 2, until the detent element 100 engages the second V-shaped notch 96 from the right. With the valve spool in the second position, communication is established between reduced portion 92 and the orifice 63 to allow a portion of the fuel to pass through such orifice while the main fuel flow is maintained through passage 58 to the filter chamber 71. With the valve spool in the second position, the annular groove 94 is aligned with vent passage 64 and exhaust passage 47 to establish a flow path through conduit 48 back to the tank 13. Thus, fuel passing through orifice 63 enters the filter chamber 72 through passage 57 filling the filter chamber with fuel. The fuel, being heavier than air, fills the lower areas of the chamber causing the air to be exhausted from the chamber through the vent passage 64. The air passes through the annular groove 94 and exhaust passage and is directed back to the tank through conduit 48. After a sufficient time has elapsed to insure that all the air is bled from the chamber, the filter unit 66 can be returned to service by manually shifting the valve spool to the third, fourth or fifth position while maintaining a constant, substantially air-free flow of filtered fuel to the fuel injection pump.

Bleeding the air from filter unit 65 after replacement of the filter elements in the filter chamber 71 is accomplished by positioning the valve spool 88 in the fourth position. This position is obtained by manually shifting the spool until the detent element 100 engages the second V-shaped notch 96 from the left. With the valve spool in this position, a portion of the fuel is diverted through the orifice 61, intake passage 56 and into chamber 71. The annular groove 93 is aligned with the vent passage 62 and exhaust passage 46 permitting the air trapped within the chamber 71 to be exhausted through exhaust port 44 and conduit 48 to the tank. The main flow of fuel is directed through passage 59 and through the filter unit 66. Thus, the filter chamber 71 is filled with fuel and the air bled therefrom prior to returning the filter unit 65 to service.

The third position of the valve spool 88 directs the fuel flow to both filters simultaneously and is provided for use in emergency situations whereby one of the filter units is partially clogged and the mechanic does not have time to change the filter element at that time. With the valve spool in the third position, the fuel is directed through passages 58 and 59 and through the respective filter units 65 and 66 as previously described.

Although the filter units 65 and 66 of the air bleed liquid filter assembly 10 are shown as being substantially identical, one of the filter units may contain more filter elements than the other. The filter unit containing the greater number of filter elements is commonly designated as the main filter unit while the filter unit with the lesser number of filter elements is designated as an auxiliary filter unit. Generally, the fuel flows through the main filter unit in bypassing relation to the auxiliary filter unit which is maintained in reserve for use when the main filter elements are being changed.

While the invention has been described and shown with particular reference to the preferred embodiment, it will be apparent that variations are possible which would fall within the spirit of the present invention and the scope of the appended claims.

What is claimed is:

1. An air bleed liquid filter assembly for a continuously operating filter system having a pair of independently replaceable filter members through which a main flow of liquid is alternatively directed comprising; valve means associated with said filter members, said valve means having a singular manipulable actuating member, said valve means selectively directing the main flow of liquid through one of said filter members to permit the replacement of the other of said filter members without the interruption of system operations or the cessation of main liquid flow upon manipulation of said singular actuating member to a first position, said singular actuating member being also selectively positionable to a second position for diverting a portion of said main flow to said other of said filter members while directing the main flow through said one of said filter members, said singular actuating member also being selectively positionable to a third position for directing flow simultaneously through both of said one and said other of said filter members, and said valve means including vent means through which any air entering the filter system during the replacement of said other of said filter members is exhausted from said filter system while main flow continues through said one of said filter members.

2. An air bleed liquid filter assembly for a continuously operating filter system having a pair of independently replaceable filter members through which a main flow of liquid is alternatively directed comprising; valve means associated with said filter members effective to selectively direct the main flow of liquid through one of said filter members to permit the replacement of the other of said filter members without the interruption of system operations or the cessation of main liquid flow, said valve means being also selectively positionable to divert a portion of said main flow to said other of said filter members while directing the main flow through said one of said filter members, and said valve means including vent means through which any air entering the filter system during the replacement of said other of said filter members is exhausted from said filter system while main flow continues through said one of said filter members, said means including a valve body having bore means, an inlet passage means directing liquid flow to said bore means, a pair of axially spaced outlet passages in said body one of each of which is connected to a separate one of said one or other of said filter members and a spool means having a reduced portion thereon forming an annular recess within said bore means and being slidably disposed within said bore means alternatively to open and to block communication between said inlet passage means and one or the other of said outlet passages, said vent means including an exhaust passage in said valve body which communicates with said bore means and which is spaced axially apart from said inlet passage means, said vent means further including a vent passage in said valve body which communicates said one of said filter members with said bore means and is spaced axially from said outlet passages, and an annular groove in said spool means which is arranged to allow communication between said vent passage and said exhaust passage upon axial adjustment of said spool means to provide an air exhaust path from said one of said filter members through said valve means when said main flow is directed by said valve means through said other of said filter members.

3. The air bleed liquid filter assembly of claim 2 wherein said valve means further include metering means communicating said bore means with said one of said filter members and spaced axially between said outlet passages, said spool means being adjustable in said bore means for communicating said inlet passage means with said metering means by way of said annular recess to divert a portion of said main flow through said one of said filter members while main flow is directed through said other of said filter members.

4. The air bleed liquid filter assembly of claim 3 wherein said metering means includes a pair of orifices with each of said orifices communicating said bore means with a separate one of said filter members, said vent means including a pair of exhaust passages and a pair of vent passages wherein each vent passage communicates said bore means with a separate one of said filter members, and said spool means including a pair of annular grooves with said annular recess forming reduced portion axially spaced between said annular grooves.

5. An air bleed liquid filter assembly for a continuously operating filter system having a pair of independently replaceable filter members through which a main flow of liquid is alternatively directed comprising; valve means associated with said filter members effective to selectively direct the main flow of liquid through one of said filter members to permit the replacement of the other of said filter members without the interruption of system operations or the cessation of main liquid flow, said valve means being also selectively positionable to divert a portion of said main flow to said other of said filter members while directing the main flow through said one of said filter members, and said valve means including vent means through which any air entering the filter system during the replacement of said other of said filter members is exhausted from said filter system while main flow continues through said one of said filter members, said valve means including a valve body having bore means, an inlet passage means directing liquid flow to said bore means, a pair of axially-spaced outlet passages in said body one of each of which is connected to a separate one of said one or other of said filter members and a spool means having a reduced portion thereon forming an annular recess within said bore means and being slidably disposed within said bore means alternatively to open and to block communication between said inlet passage means and one or the other of said outlet passages, said valve means further including detent means for acting upon said spool means to hold said spool means in any of a plurality of selected positions, said detent means having a detent element within said body in contact with said spool means, resilient means acting upon said detent element to urge said element against said spool means, and a plurality of grooves axially spaced along said spool means to receive said element whereby said detent means resists axial movement of said spool means.

6. The air bleed liquid filter assembly of claim 5 including a mounting base means having a rectangular block portion which has opposite sides, a pair of tubular extensions individually secured to said opposite sides with each tubular extension defining a filter chamber, and each filter chamber capable of housing at least one replaceable filter element within.

7. The air bleed liquid filter assembly of claim 6 wherein said valve body of said valve means is mounted directly upon said mounting block portion of said mounting base means.

8. The air bleed liquid filter assembly of claim 6 wherein said block portion includes a pair of intake chambers each of which communicates one of said filter chambers with one of said outlet passages, one of said orifices, and one of said vent passages of said valve body, and a pair of outlet chambers leading from said filter chambers.

9. The air bleed liquid filter assembly of claim 8 wherein a check valve is disposed in each of said outlet chambers in said block portion to prevent a reverse flow of liquid from one of said filter chambers to the other of said filter chambers.

10. An air bleed liquid filter assembly for a continuously operating filter system having a pair of independently replaceable filter members through which a main flow of liquid is alternatively directed comprising; valve means associated with said filter members for selectively directing the main flow of liquid through one of said filter members to permit the replacement of the other of said filter members without the interruption of system operations or the cessation of main liquid flow, said valve means being also selectively postionable for diverting a portion of said main flow to said other of said filter members while directing the main flow through one of said filter members, said valve means also being selectively positionable for directing flow simultaneously through both of said one and said other of said filter members, and said valve means including vent means through which any air entering the filter system during the replacement of said other of said filter members is exhausted from said filter system while main flow continues through said one of said filter members, said valve means further including a valve body having bore means, an inlet passage means directing liquid flow to said bore means, a pair of axially spaced outlet passages in said body one of each of which is connected to a separate one of said or other of said filter members and a spool means having a reduced portion thereon forming an annular recess within said bore means and being slidably disposed within said bore means alternatively to open and to block communication between said inlet passage means and one or the other of said outlet passages.

* * * * *

UNITED STATES PATENT OFFICE
CERTIFICATE OF CORRECTION

Patent No. 3,815,746　　　　　　　　　Dated June 11, 1974

Inventor(s)　HAROLD L. WARD

It is certified that error appears in the above-identified patent and that said Letters Patent are hereby corrected as shown below:

Column 6, line 66, after "said" insert --valve-- (second instance).

Signed and sealed this 29th day of October 1974.

(SEAL)
Attest:

McCOY M. GIBSON JR.　　　　　　　　C. MARSHALL DANN
Attesting Officer　　　　　　　　　Commissioner of Patents